United States Patent [19]

Lucas

[11] Patent Number: 5,153,366

[45] Date of Patent: Oct. 6, 1992

[54] METHOD FOR ALLOCATING AND ASSIGNING DEFENSIVE WEAPONS AGAINST ATTACKING WEAPONS

[75] Inventor: Thomas W. Lucas, Brea, Calif.

[73] Assignee: Hughes Aircraft Company, Los Angeles, Calif.

[21] Appl. No.: 528,285

[22] Filed: May 22, 1990

Related U.S. Application Data

[63] Continuation of Ser. No. 300,640, Dec. 23, 1988, abandoned.

[51] Int. Cl.$^5$ .............................................. F41G 9/00
[52] U.S. Cl. ...................................................... 89/1.11
[58] Field of Search ........................................ 89/1.11

[56] References Cited

U.S. PATENT DOCUMENTS 4,267,562 5/1981 Raimondi ............................ 89/1.11
4,848,208 7/1989 Kosman .............................. 89/1.11

Primary Examiner—David H. Brown
Attorney, Agent, or Firm—Wanda K. Denson-Low

[57] ABSTRACT

The present method includes estimating for each kth one of K attack weapons a target threat value, $P^k$, and for each available counter-weapons a counter-threat value, $P_k$, against each kth attack weapon. Prospective counter-weapon allocations are tabulated. Each ith allocation has $N_i$ counter-weapons and for each a reduced target threat value:

$$E_{Ri} = \sum_{k=1}^{K} P^k (1 - P_k)^{x_{ki}},$$

is computed, $x_{ki}$ being equal to the integer number of counter-weapons in the ith allocation assigned to a kth one of the attack weapons, assuming one type of counter-weapons. The set of $x_{ki}$'s that causes $E_{Ri}$ to be a minimum is the optimum counter-weapon assignment for the ith allocation. One of the prospective allocations is selected for a first "shoot-look" cycle in which the $N_i$ counter-weapons are assigned according to the optimum $x_{ki}$'s. The procedure may be repeated for subsequent "shoot-look" cycles. If there aare more than one type of counter-weapons, $E_{Ri}$ is obtained by the equation:

$$E_{Ri} = \sum_{k=1}^{K} P^k \prod_{l=1}^{L} (1 - P_{lk})^{x_{lki}},$$

wherein $x_{lki}$ is the integer number of the counter-weapons of the lth type assigned to the kth attack weapon and L is the total number of different counter-weapon types. The set of $x_{lki}$'s causing $E_{Ri}$ to be a minimum is the optimum counter-weapon assignment for the allocation.

10 Claims, 2 Drawing Sheets

METHOD FOR ALLOCATING AND ASSIGNING DEFENSIVE WEAPONS AGAINST ATTACKING WEAPONS

This is a continuation of application Ser. No. 300,640, filed Dec. 23, 1988, now abandoned.

BACKGROUND OF THE INVENTION

1. Field of the Invention:

The present invention relates generally to the field of weapons allocation in a battlefield environment and more particularly to methods for battlefield allocation and assignment of counter-weapons against offensive weapons directed at a defending force.

2. Background Discussion:

The effective defending of forces or positions under modern battlefield conditions is almost always a formidable task. Such forces or positions can expect to be attacked by many offensive weapons which have different destructive capabilities, which may be directed from different quarters and which will typically, at any instant in time, have different ranges, altitudes and closing speeds. Typical offensive weapons or weapons carriers encountered by defending forces may vary according to particular battlefield nature, and may include guided, homing and ballistic missiles; attack, bomber and helicopter aircraft; bombs and artillery shells; armored vehicles or ships; torpedoes and submarines. Types of warheads carried by these offensive weapons may be conventional explosives, CBN (chemical, biological, nuclear) and ECM (electronic counter measure) and/or ECCM (electronic counter counter measure) apparatus.

The types of defensive or counter-weapons which may presently be available for use against attack weapons are usually more limited and typically include such expendable weapons as guided and homing missiles, automatic cannon shells and, for naval forces, torpedoes and depth charges. Defensive warhead types include conventional and nuclear explosives as well as ECM and ECCM.

Assuming that the defending force has available a store of counter-weapons, an extremely difficult problem is the allocation and assignment of these counter-weapons against the attack weapons (and weapons carriers) in such a manner that damage to the defending force or position is prevented or is at least minimized. Instant, difficult decisions must thus be made regarding how many of what types of counter-weapons are to be fired when, at each incoming weapon, to achieve the best defensive results.

As a start, a classification or ranking of the incoming weapons as to their destructive threat against the defending force or position is generally made, for example, by the responsible Force Warfare Commander (FWC). This threat classification or ranking is typically based on the FWC's experience with the types of the incoming weapons and upon such additional factors as target prediction and the ranges and closing speeds of the attack weapons. This weapons information may be provided to the FWC from visual and/or electronic determinations. The FWC must next estimate or predict the destructive threat against each type of incoming weapon of each type of available counter-weapon. Based upon such information and also upon additional factors, including the number of counter-weapons available, the projected scope of the present attack, the probability of follow-on attacks and the anticipated counter-weapon resupply situation, the FWC allocates and assigns counter-weapons to the incoming weapons so as, in the FWC's judgment, to minimize the threat of the attack.

It can be appreciated that this difficult decision process involves such difficult questions as whether to fire at a distant attack weapon, thereby reducing the probability of destruction by the counter-weapon but allowing time for one or more "shoot-look" cycles, or whether to wait until the attack weapon is closer, thereby providing a greater probability of destruction of the attack weapon but not permitting sufficient time for a second "shoot-look" cycle. In addition, there are important decisions based upon defense weapons reserves, such as whether to fire one relatively effective counter-weapon or to fire more than one less effective counter-weapon against particular incoming weapons.

Adding to the FWC's decision problems is the fact that most attack situations are extremely fluid, with additional and/or new types of attack weapons being introduced into the attack by the enemy and with prior attack weapons closing in range, changing directions, being destroyed, impacting targets or otherwise being eliminated as threats. Moreover, some targets may be eliminated by attack weapons and others may, if mobile, change their positions. Also, available supplies of some types of counter-weapons may be depleted or may have to be held in reserve. Threat assessments, therefore, require continual updating.

Clearly, for an FWC to be capable of directing an effective defense against a concerted attack, he must not only have an intimate knowledge of the characteristics of all types of attack weapons and available counter-weapons but he must also be skilled in the assessment of the effectiveness of attack weapons against the defending force and of the counter-weapons against the attack weapons. Even with such skills and experience, confusing and rapidly changing battle conditions, as well as the severe stresses to which the FWC is exposed, may adversely affect the FWC's judgement and attack weapons may be allowed to leak through the defense. Moreover, it can by no means be guaranteed that FWC's with the requisite skill and experience will be available in all defense situations or that equally skilled and experienced replacements will be available in the event the FWC is killed or wounded in an attack. Particularly in peacetime, the skill and experience needed by an FWC to effectively direct a defense under actual battle conditions is almost impossible to obtain because the difficulty of simulating an actual battle condition.

Because the directing of an effective defense during battle is ordinarily crucial to the survival of the defending force, and because of the extreme analysis and decisional problems faced by a FWC in effectively allocating and assigning defensive weapons against attack weapons in actual battle situations, it can be appreciated that improvements to present counter-weapon allocation and assignment methods are very much needed and may indeed be crucial to the outcome of any future war.

As described above, much, if not most, of the problems associated with effective counter-weapon allocation and assignment is caused by the vast amount of data relating to the attack and counter-weapons that must be gathered and instantaneously processed by the FWC. The FWC's ability to perform these tasks effectively on a real time basis and under stress may simply be overwhelmed during battle by the sheer magnitude of of the data that must be intelligently correlated to sustain an effective defense.

Although many judgmental decisions of an FWC probably cannot, at present, be entirely eliminated from the counter-weapons allocation and assignment process, the present inventor considers that much of the FWC's task can be systematized and taken over by suitably configured computers to an extent appreciably improving the consistency and effectiveness of the defense. It is to this end that the present invention is directed.

SUMMARY OF THE INVENTION

According to the present invention, a method is provided for allocating and assigning defensive counter-weapons against incoming attack weapons. In general, in response to an enemy attack on a target by a plurality, K, of attack weapons, the counter-weapons are allocated and assigned from a plurality, M, of available counter-weapons. The present method of allocating and assigning the counter-weapons includes estimating for each kth one of the K attack weapons a target threat value, $P^k$, relative to the target (wherein k = 1, 2, ..., K) and also estimating for each one of the M counter-weapons a counter-threat value relative to each kth one of the K attack weapons. A series of prospective allocations of different numbers, $N_i$, of counter-weapons is then provided. For each ith one of these prospective counter-weapon allocations, there is determined, based upon combining the estimated counter-threat values with the estimated target threat values according to a pre-established relationship, an associated optimum assignment of the $N_i$ counter-weapons against the K attack weapons. Such optimum counter-weapon assignment is that particular counter-weapon assignment that causes an associated composite reduced target threat value, $E_{Ri}$, of the attack weapons against the target to have a minimum value. Stated otherwise, only for the optimum counter-weapon assignment for any particular ith counter-weapon allocation is the minimum value of $E_{Ri}$ obtained.

Further included in the method of the present invention are the steps of selecting from the series of prospective counter-weapon allocations a particular allocation to be used against the K attack weapons and assigning the $N_i$ counter-weapons of the particular selected allocation against the K attack weapons in accordance with the associated optimum weapons assignment.

When the number of counter-weapons, $N_i$, in the particular selected counter-weapon allocation is less than the number M of available counter-weapons, after the allocated, $N_i$, counter-weapons have been fired against the K attack weapons, the kill effectiveness of the fired weapons may be determined. The method of the present invention may then include establishing a new series of prospective counter-weapon allocations of different numbers, $N_j$, of counter-weapons against the surviving attack weapons. Based upon combining the estimated counter-threat values of the remaining counter-weapons with the estimated target threat values of the surviving attack weapons in the predetermined manner, there is determined for each jth one of a new series of prospective allocations an associated optimum assignment of the $N_j$ counter-weapons against the remaining attack weapons that causes the associated composite reduced target threat value, $E_{Rj}$, of the surviving attack weapons against the target to have a minimum value. The method then includes selecting from the new series of prospective counter-weapon allocations, a particular jth one of the allocations for use against the surviving attack weapons and assigning the associated $N_j$ counter-weapons against the surviving attack weapons in accordance with the optimum weapons assignment associated with the selected allocation. Also, there may be included the steps of estimating for at least some of the remaining attack weapons updated target threat values relative to the target, estimating for at least some of the remaining counter-weapons updated counter-threat values relative to each one of the remaining attack weapons; and then using the updated target threat and counter-threat values for determining the new optimum counter-weapon assignments associated with the new series of prospective counter-weapon allocations.

According to one version of the invention, all the available counter-weapons are, for purposes of weapons allocation and assignment, presumed to be substantially the same type of weapon. As a result, each of the counter-weapons is presumed to have the same estimated counter-threat value, $P_k$, against any kth one of the K attack weapons. In such case, the step of determining the optimum weapons assignments for the series of prospective counter-weapons allocations includes computing the corresponding minimum composite reduced threat values, $E_{Ri}$, according to the equation:

$$E_{Ri} = \sum_{k=1}^{K} P^k (1 - P_k)^{x_{ki}}.$$

In such equation $x_{ki}$ is equal to the integer number of counter-weapons in the ith allocation of $N_i$ counter-weapons that is assigned to the kth one of the K attack weapons $(0 \leq x_{ki} \leq N_i)$, the values of $x_{ki}$ being selected for causing the associated composite reduced target threat value, $E_{Ri}$, to be a minimum.

However, the available counter-weapons may alternatively include first and second weapons types, each counter-weapon of the first weapon type having the same first counter-threat value, $P_{1k}$, against any kth one of the K attack weapons and each counter-weapon of the second weapon type having the same second counter-threat value, $P_{2k}$, against any kth one of the K attack weapons. The step of determining the optimum counter-weapons assignment for each ith one of the prospective allocations then includes determining the associated composite reduced target threat values, $E_{Ri}$, by the general expression:

$$E_{Ri} = \sum_{i=1}^{K} P^k \prod_{l=1}^{L} (1 - P_{1k})^{x_{1ki}}.$$

In such expression, for the assumed two different types of counter-weapons, L is equal to 2 and $x_{lki}$ is equal to the integer number of counter weapons of the lth type assigned to the kth one of the K attack weapons for the ith prospective counter-weapon allocation. The $x_{lki}$'s for each ith one of the prospective counter-weapon allocations are selected to causes the associated composite reduced target threat to be a minimum for the number, $N_i$, of counter-weapons allocated in the ith prospective allocation.

In any event, when the number, M, of available counter-weapons is greater than the number, K, of attack weapons, the method may include the step of defining as a default allocation the particular ith prospective allocation of counter-weapons for which the number, $N_i$, of counter-weapons allocated is equal to the number, K, of attack weapons. The method then includes the steps of selecting the default allocation and using the optimum weapons assignment associated therewith in the event a more considered selection of one of the prospective allocations cannot be made.

BRIEF DESCRIPTION OF THE DRAWINGS

A better understanding of the present invention may be had from a consideration of the accompanying drawings in which.

DESCRIPTION OF THE PREFERRED EMBODIMENT

Figure 1:
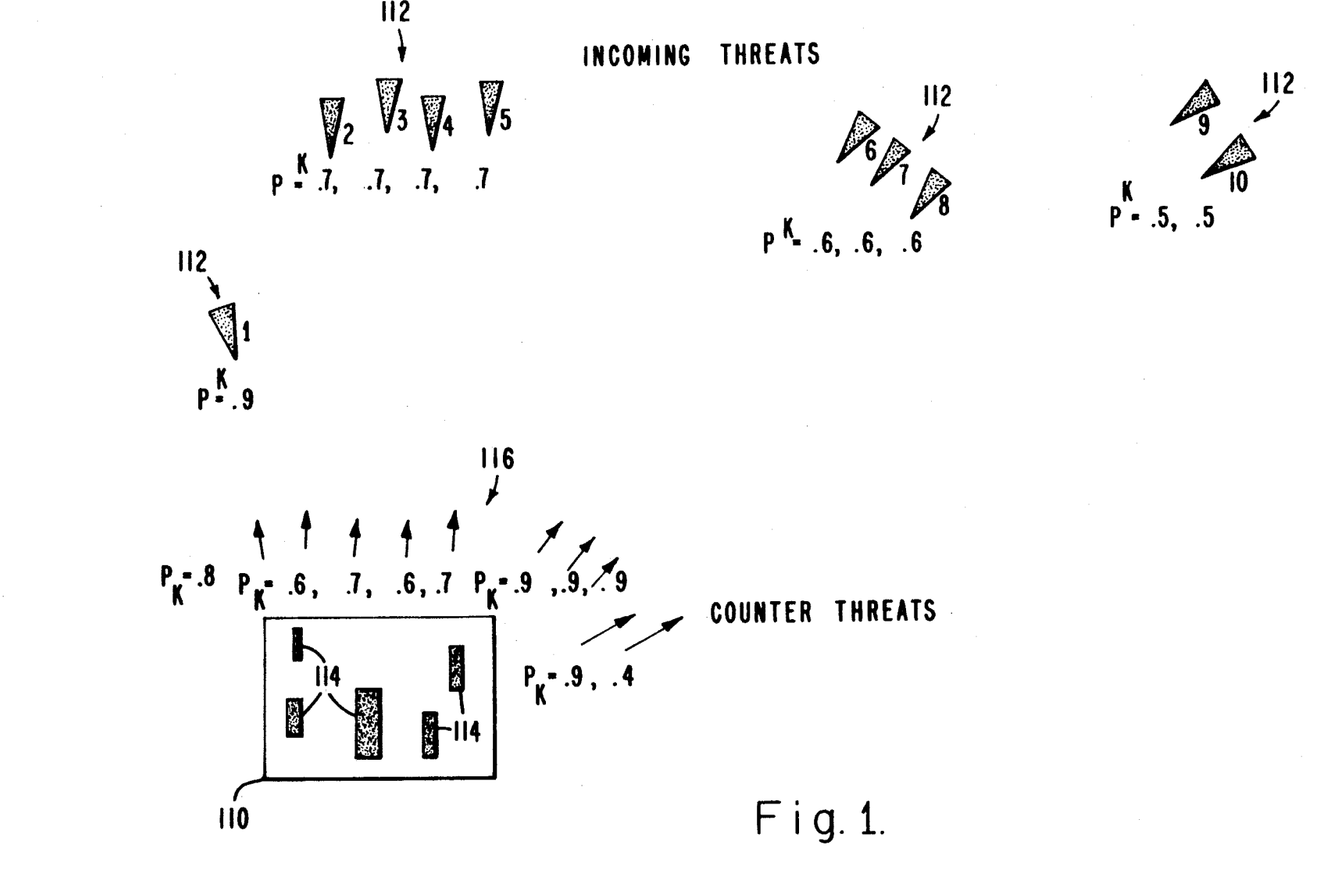
FIG. 1 is a pictorial diagram depicting an exemplary battlefield scenario in which a friendly battle force is under attack by a plurality of enemy attack weapons (incoming threats) and showing the available defensive weapons, there being shown exemplary, estimated target threat values associated with the incoming threats and estimated counter-threat values associated with the defensive weapons.

There is depicted in FIG. 1 an exemplary battlefield scenario in which a friendly battle force 110 is being attacked by a number of incoming attack weapons (incoming threats) 112. Battle force 110 may, by way of an illustrative example, collectively comprise a number of individual targets 114, for example, ships in a naval battlefield scenario. Available to battle force 110 is a supply of counter-weapons (counter-threats) 116 which may be used to destroy incoming attack weapons 112, and thereby eliminate or reduce the threat to targets 114. The function of the present invention is to provide, for various counter-weapon allocations, optimum counter-weapon assignments against attack weapons 112 which best carries out the primary defensive purpose of protecting targets 114.

Although it is to be understood that the counter-weapon allocation and assignment method of the present invention is generally applicable to most defensive battlefield scenarios, it will be presumed for the purpose of describing the invention that the battlefield scenario depicted in FIG. 1 represents a situation in which incoming attack weapons 112 are in the general range of about 20 nautical miles (NM) to about 200 NM (i.e., between about 37.1 and about 371 Km) from battle force 110. If it is further presumed that battle force 110 is a naval battle force, incoming attack weapons 112 may comprise attack weapons that have successfully penetrated or eluded battle force picket ships (not shown) which may be deployed several hundred NM around or in advance of the battle force.

Within the presumed 20 to 200 NM (37.1-371 Km) attack weapon range, there will ordinarily be sufficient time for battle force 110 to mount a reasonably considered counter strike against attack weapons 112 by counter-weapons 116. Moreover, for such an exemplary attack target range, there is usually also sufficient time for two or more counter-weapon "shoot-look" cycles, in which a selected allocation of counter-weapons 116 is fired at attack weapons 112 and the destructive effect of the firing is, at least, partly determined before a second allocation of counter-weapons is fired at any surviving attack weapons. As can be appreciated, the availability of two or more "shoot-look" cycles permits a more economical allocation of defensive weapons 116 than is generally possible when the attack target range is so short that there is time for only one firing of the counter-weapons. In this latter case, an excessive counter-weapon allocation may be necessary to assure destruction of all attack weapons 112.

Figure 2:
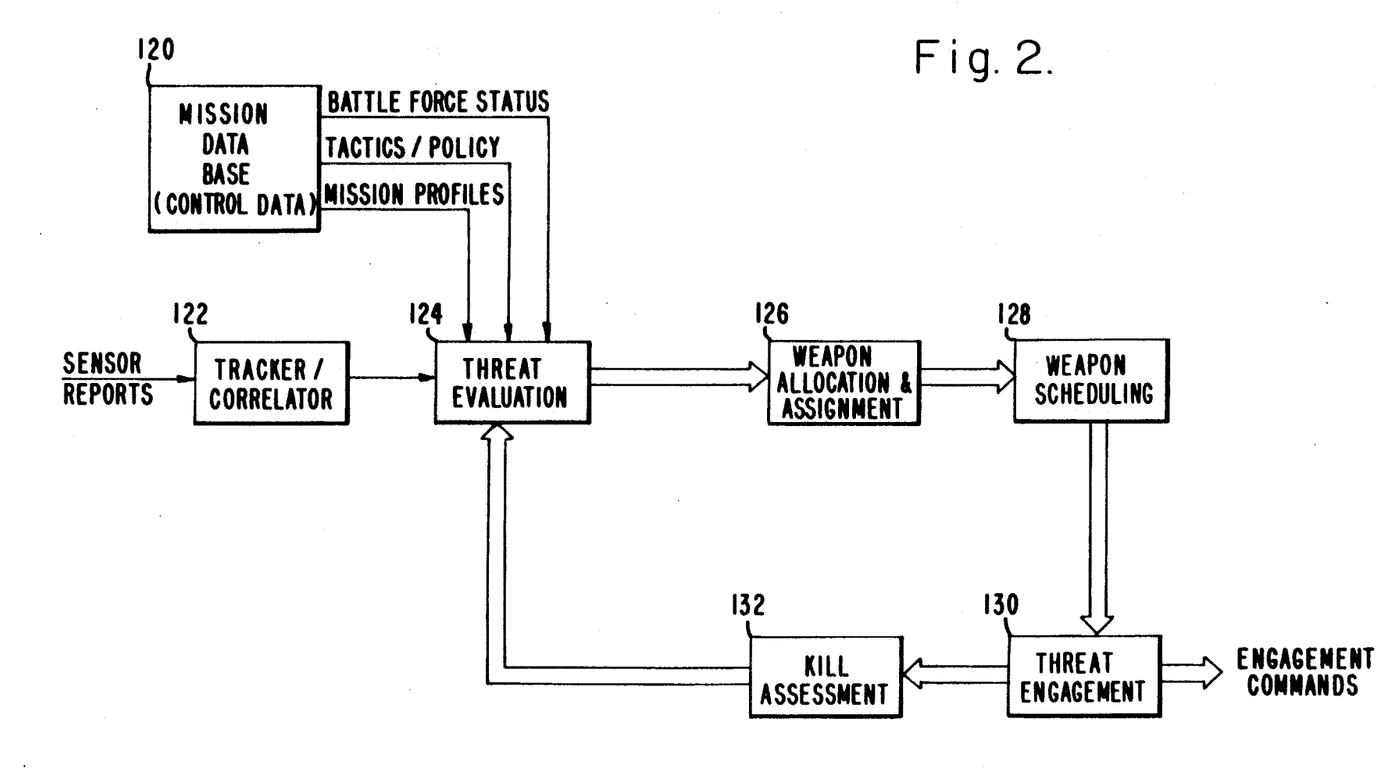
FIG. 2 is a diagram, in an operational block diagram form, showing a typical battle force threat engagement program relating to the battlefield scenario of FIG. 1, the program using the counter-weapon allocation and assignment method of the present invention.

A general approach or program associated with counter-weapon allocation and assignment relative to attack weapons 112 is depicted, in operational block diagram form, in FIG. 2. As depicted, the defensive program includes the following functions: mission data base generation 120, tracker/correlator analysis 122, threat evaluation 124, counter-weapon allocation and assignment 126, weapon scheduling 128, attack threat engagement 130 and kill assessment 132. As more particularly described below, mission data base generation 120 and tracker/correlator analysis 122 provide the input data concerning targets 114, attack weapons 112 and counter-weapons 116 needed for threat evaluation 124. Based upon the data from threat evaluation 124, counter-weapons 116 are allocated and assigned by weapon allocation and assignment 126, scheduling being then performed by weapon scheduling 128. After actual threat engagement 130, the results are determined by kill assessment 132 and these results are fed back to threat evaluation 124 to enable the updating of the threat evaluation process prior to a next counter-weapon allocation and assignment associated with the next "shoot-look" cycle.

Numerical threat values are assigned by threat evaluation 124 both to all incoming attack weapons 112 and all available counter-weapons 116. For purposes of describing the present invention, the attack weapon threat value of each kth one of the K attack weapons 112 against targets 114 is identified as the probability, $P^k$. That is, the value, $P^k$, is the probability that the kth one of incoming weapons 112 will destroy its intended target. Similarly, the counter-weapon threat value of each counter weapon 116 against the kth one of incoming weapon 112 is identified as $P_k$, which is the probability that any one of the counter-weapons will destroy the kth one of the attack weapons. Initially it is presumed herein that all M available counter-weapons 116 are of the same type so that each counter-weapon has the same threat value, $P_k$ against the same kth attack weapon 112. Subsequently, the more general case in which there is more than one type of available counter-weapons 114, and hence more than one set of counter-threat values $P_k$, will be described.

Mission data base generation 120 provides information relative to battle force status, tactics/policy and mission profiles to threat evaluation 124. Battle force status information relates to the estimated value or relative value of targets 116 for the particular military mission involved in the battlefield scenario under consideration. As an example, an aircraft carrier or a battleship would ordinarily be assigned a much greater value than a destroyer. Battle force status may also be a function of time, different targets 114 being assigned different values, from time to time, as the battlefield scenario unfolds. Such target values or relative values may, for example, for a naval force, be assigned by the Fleet Commanding Officer. Tactics/policy information relates to defense tactics relevant to the particular battlefield scenario, and may for example include general policies as to the number of "shoot-look" cycles which ordinarily would be used, or to the percentage of available counter-weapons 116 to be kept in reserve against future enemy attack. Such tactics/policies may generally be promulgated by the Battle Force Commander. In turn, mission profiles relate to general capabilities of targets 114 and of counter-weapons 116, may also be provided by the Battle Force Commander. In any event, for the purposes of the present invention, it is presumed that information relating to the mission data base is known and is available for use in the threat evaluation step.

Attack weapon information is provided to tracker/correlator analysis 122 from a variety of presumably available sensors (not shown), such as radars, sonobouys, infrared detectors and satellites, as well as from communications from friendly observers and picket ships. In response to such attack weapon information, tracker/correlator analysis 122 identifies all incoming attack weapons 112 as to type, range, heading, altitude and velocity, and predicts probable targets for each incoming weapon. Such information, which for purposes of the present invention is considered to be known and available, is also provided to threat evaluation 124.

Threat evaluation 124 establishes the target threat values, $P^k$, for each one of the K incoming weapons 112 and the counter-weapon threat values, $P_k$, for each of the number, M, of available counter-weapons 116. The target threat values, $P^k$, (wherein $k=1, 2, \ldots, K$) may, for example, be composed of the product of several factors as represented by the following general target threat equation:

$$P^k = P_I P_{H/I} P_{D/I,H}, \quad \text{(Eqn. 1)}$$

wherein $P_I$ is the probability that any particular kth attack weapon 112 intends to hit a particular target 116, $P_{H/I}$ is the probability that the weapon will hit the intended target and $P_{D/I,H}$ is the estimate of damage, given that the intended target is correctly identified and is actually hit by the weapon. It is, however, to be understood that other expressions may be used for obtaining target threat values, $P^k$, and the invention is not limited to the expression of Equation 1. It is also to be understood that attack weapons 112 may include, in addition to such actual weapons as missiles and torpedoes, weapons carriers such as aircraft, submariens and ships. Decimal numerical values allotted to the $P^k$'s may, for instance, vary between zero (no threat) and unity (complete destruction), the estimated values being made, for example, by the Force Warfare Commander (FWC).

In an analogous manner, the FWC estimates the counter-weapon threat values, $P_k$, against attack weapons 112 from a knowledge of the characteristics of counter-weapons 116 and the attack weapons. These $P_k$ values may be composed (in the manner of Equation 1) of the product of a probability that a kth aimed-at attack weapon 112 will be "hit" and an estimate of the damage done to such attack weapon, assuming it is "hit." By "hit" it is meant that the assigned counter-weapon 116 somehow disruptively affects its intended attack weapon 112 and includes, as an example, an ECM type of counter-weapon 116 deflecting a guided missile as well as a projectile actually impacting an attack weapon. The estimated $P_k$ values are typically also decimal numbers between zero and unity.

Table 1 below lists, for the exemplary battlefield scenario depicted in FIG. 1, a typical estimated set of $P^k$ values for the ten (10) attack weapons 112 shown in the FIG. and also lists the corresponding set of typical estimated $P_k$ values for counter-weapons 116 (assuming that all the counter-weapons are of the same type so that only one set of $P_k$ values are needed).

TABLE 1

| Attack Weapon Number | 1 | 2 | 3 | 4 | 5 | 6 | 7 | 8 | 9 | 10 |
|---|---|---|---|---|---|---|---|---|---|---|
| $P^k$ Value (112) | .9 | .7 | .7 | .7 | .7 | .6 | .6 | .6 | .5 | .5 |
| $P_k$ Value (116) | .8 | .6 | .7 | .6 | .7 | .9 | .9 | .9 | .9 | .4 |

The $P^k$ and $P_k$ values shown in Table 1 are also shown in FIG. 1.

After the target threat values, $P^k$, have been estimated in the manner described above, a total threat effectiveness, $E_T$, of the attack weapons against battle force 110, in the absence of any countering action, can be computed by summing the individual target threat values in accordance with the expression:

$$E_T = \sum_{k=1}^{K} P^k. \quad \text{(Eqn. 2)}$$

In accordance with Equation 2, the total threat effectiveness, $E_T$, is a positive number which represents the magnitude of the total incoming threat (in the absence of any defensive counter-threat). Since the target threat value, $P^k$, of each kth one of attack weapons 112 has a value between zero and unity, the total threat effectiveness, $E_T$, obtained by Equation 2 will be a number between zero and K. If, as an example, each attack weapon 112 has an estimated threat value close to unity, the total threat effectiveness, $E_T$, will be close to K, thereby indicating the probability of a full kill of battle force 110 plus $K-1$ units of "overkill."

Alternatively, the target threat values, $P^k$, may be combined as if the threat values represented independent probabilities, in which case the total threat effectiveness, $E_T$, is given by the following general expression:

$$E_T = \sum_{k=1}^{K} P^k = 1 - \prod_{k=1}^{K} (1 - P^k), \quad \text{(Eqn. 3)}$$

wherein the symbol, $\Sigma$, indicates iterated probabilistic addition and the value of $E_T$ obtained is a probability having a value between the largest value of $P^k$ and unity.

The value of total threat effectiveness, $E_T$, obtained by the use of Equation 2 is referred to as the linear summed value of $E_T$, whereas, the value of $E_T$ obtained by the use of Equation 3 is referred to as the "combinatoric" summed value of $E_T$. For purposes of illustrating the present invention, the linear summed value of the total effective threat value, $E_T$, will principally be used hereinafter. Although, the combinatoric summed value of $E_T$ can alternatively be used, the resulting $E_T$ values are possibly more difficult for non-mathematicians to understand and apply to the weapon allocation and assignment method of the present invention.

With respect to the counter-weapon threat values, $P_k$, the probability that a kth incoming weapon 112 will survive the countering weapon is:

$$Q_k = (1 - P_k) \quad \text{(Eqn. 4)}$$

As a result, the kth incoming threat value, $P^k$, will have its value reduced by the counter-threat down to the value $P^k Q_k$. If two counter-weapons 116 of the same type are fired against the kth incoming threat 112, then the reduced threat value is computed as $P^k(Q_k)^2$. More generally, if the number of counter-weapons 116 fired independently at the kth incoming threat 112 is a variable, $x_k$, then the reduced threat value of the kth incoming threat is reduced to $P^k(Q_k)^{x_k}$, the number of weapons, $x_k$, being used as an exponent in the calculation.

Based upon the above reduced threat value for the kth incoming threat 112, a composite reduced threat value, $E_{Ri}$, is given (referring to Equation 2) for any ith counter-weapon allocation by the expression:

$$E_{Ri} = \sum_{k=1}^{K} P^k(1 - P_k)^{x_{ki}} = \sum_{k=1}^{K} P^k(Q_k)^{x_{ki}}. \quad \text{(Eqn. 5)}$$

Alternatively (referring to Equation 3), a corresponding combinatoric composite reduced threat value, $E_{Ri}$, is obtained:

$$E_{Ri} = \sum_{k=1}^{K} P^k(Q_k)^{x_{ki}}. \quad \text{(Eqn. 6)}$$

Considering the linear summed reduced threat value, $E_{Ri}$, obtained by Equation 5, for any number, $N_i$, of allocated counter-weapons 114 in the ith allocation:

$$N_i = \sum_{k=1}^{K} x_{ki}. \quad \text{(Eqn. 7)}$$

For $N_i$ equal to or less than the total number, M, of available counter-weapons 116, there will be at least one particular selection of the $x_{ki}$'s that will result in the composite reduced threat value, $E_{Ri}$, having a minimum value. Since this minimum $E_{Ri}$ value represents the minimum threat to battle force 110 that can be achieved by firing an ith allocation of $N_i$ counter-weapons 116 against attack weapons 112, the particular selection of the $x_{ki}$'s giving rise to the minimum $E_{Ri}$ represents the optimum counter-weapon assignment for that particular ith allocation of counter-weapons. It is, of course, to be appreciated that for different counter-weapons allocations, $N_i$, different minimum values of $E_{Ri}$ will be obtained, as will be different associated or corresponding optimum counter-weapon assignments.

By the minimum value of composite reduced threat value, $E_{Ri}$, it is meant that minimum value of $E_{Ri}$ obtained by constraining the $x_{ki}$'s to have integer values. Although lower values for $E_{Ri}$ might be obtained by considering fractional values for the $x_{ki}$'s, such fractional values are not considered meaningful with respect to counter-weapon assignments under actual battlefield conditions. Correspondingly, by an optimum counter-weapon assignment it is meant that assignment of integer numbers of counter-weapons 116 in the ith allocation that causes the associated value of $E_{Ri}$ to be a minimum.

Tables can accordingly be prepared which tabulate the optimum counter-weapon allocations, obtained through operation of Equations 5 or 6, for different prospective ith allocations of $N_i$ counter-weapons 116, the reduced threat value, $E_{Ri}$, being a minimum (as above-defined) for each such prospective ith allocation. A representative tabulation based upon the previously assumed $P^k$ and $P_k$ values and for the assumed number ten of attack weapons 112 and for M equal to twenty is presented in Table 2 for illustrative purposes.

TABLE 2

| $N_i$ | $E_{Ri}$ | $\Delta E_{Ri}$ | Counter-Weapon Assignment For Attack Weapon Number: | | | | | | | | | |
|---|---|---|---|---|---|---|---|---|---|---|---|---|
| | | | 1 | 2 | 3 | 4 | 5 | 6 | 7 | 8 | 9 | 10 |
| 0 | 6.50 | | 0 | 0 | 0 | 0 | 0 | 0 | 0 | 0 | 0 | 0 |
| 9 | 1.89 | 4.61 | 1 | 1 | 1 | 1 | 1 | 1 | 1 | 1 | 1 | 0 |
| 10 | 1.69 | .20 | 1 | 1 | 1 | 1 | 1 | 1 | 1 | 1 | 1 | 1 |
| 11 | 1.57 | .12 | 1 | 2 | 1 | 1 | 1 | 1 | 1 | 1 | 1 | 1 |
| 12 | 1.45 | .12 | 1 | 2 | 1 | 2 | 1 | 1 | 1 | 1 | 1 | 1 |
| 13 | 1.30 | .15 | 1 | 2 | 1 | 2 | 2 | 1 | 1 | 1 | 1 | 1 |
| 14 | 1.15 | .15 | 1 | 2 | 2 | 2 | 2 | 1 | 1 | 1 | 1 | 1 |
| 15 | 1.01 | .14 | 2 | 2 | 2 | 2 | 2 | 1 | 1 | 1 | 1 | 1 |
| 16 | .89 | .12 | 2 | 2 | 2 | 2 | 2 | 1 | 1 | 1 | 1 | 2 |
| 17 | .80 | .09 | 2 | 2 | 2 | 2 | 2 | 1 | 1 | 1 | 1 | 3 |
| 18 | .73 | .07 | 2 | 3 | 2 | 2 | 2 | 1 | 1 | 1 | 1 | 3 |
| 19 | .66 | .07 | 2 | 3 | 2 | 3 | 2 | 1 | 1 | 1 | 1 | 3 |
| 20 | .61 | .05 | 2 | 3 | 2 | 3 | 2 | 2 | 1 | 1 | 1 | 3 |

Given the availability of such reduced threat/optimum counter-weapon assignment Tables, an FWC or other battle force personnel can select among the prospective counter-threat allocations and apply the associated optimum counter-weapon assignment.

By way of continued example, let it be assumed that the FWC has elected to select $N_i$ equal to 10 from Table 2, and therefore assigns one counter-weapon 116 to be fired at each one of attack weapons 112. Moreover, let it be assumed that such a counter-weapon assignment is successful, after firing (according to weapon scheduling 128) in destroying or disabling attack weapon numbers 1, 4, 6, 7, 8 and 10 (as determined by kill assessment 132). There may then be computed, using the same set of $P^k$'s and $P_k$'s as before, the second set of prospective counter-weapon allocations shown in Table 3.

TABLE 3

| $N_j$ | $E_{Rj}$ | $\Delta E_{Rj}$ | Counter-Weapon Assignment For Attack Weapon Number: | | | | | | | | | |
|---|---|---|---|---|---|---|---|---|---|---|---|---|
| | | | 1 | 2 | 3 | 4 | 5 | 6 | 7 | 8 | 9 | 10 |
| 0 | 2.60 | | x | 0 | 0 | x | 0 | x | x | x | 0 | x |
| 1 | 2.11 | .57 | x | 0 | 1 | x | 0 | x | x | x | 0 | x |
| 2 | 1.62 | .49 | x | 0 | 1 | x | 1 | x | x | x | 0 | x |
| 3 | 1.20 | .42 | x | 1 | 1 | x | 1 | x | x | x | 0 | x |
| 4 | .75 | .45 | x | 1 | 1 | x | 1 | x | x | x | 1 | x |
| 5 | .58 | .17 | x | 2 | 1 | x | 1 | x | x | x | 1 | x |
| 6 | .43 | .15 | x | 2 | 1 | x | 2 | x | x | x | 1 | x |
| 7 | .28 | .15 | x | 2 | 2 | x | 2 | x | x | x | 1 | x |
| 8 | .22 | .05 | x | 3 | 2 | x | 2 | x | x | x | 1 | x |
| 9 | .18 | .04 | x | 3 | 2 | x | 3 | x | x | x | 1 | x |
| 10 | .14 | .04 | x | 3 | 2 | x | 3 | x | x | x | 2 | x |

It may, for example, be assumed that the FWC now elects to fire four ($N_j = 4$) counter-weapons 116 with the corresponding assignment being one counter-weapon for each attack weapon 112. If all the remaining four attack weapons 112 are not destroyed, the procedure may be repeated for another (third) "shoot-look" cycle. If all the remaining attack weapons are destroyed in this second "shoot-look" cycle, another "shoot-look" cycle is, of course, unnecessary.

Alternatively, for the preparation of Table 3, some or all of the $P^k$'s and $P_k$'s may be updated (by threat evaluation 124) as necessary or desirable to reflect an updating of the battlefield assessment after the first allocation of counter-weapons 116 has been fired.

In the above description and example, it has been assumed that all M counter-weapons 116 are of the same type so that each has the same counter-threat value, $P_k$, against any kth one of the K attack weapons 112. The possibility or probability, of course, exists that the M counter-weapons 116 will be of more than one type. In the case of multiple weapon types, each type is limited in number. In mathematical terms, this equates to saying that if the number of each weapon type available is $M_1$, then with $M_1$ is positive, the sum of all $M_1$ is equal to M. In this case, all counter-weapons 116 of a first type will have the same first counter-threat value, $P_{1k}$, against any kth attack weapon 112, all the counter-weapons of a second type will have the same, second counter-weapon threat, $P_{2k}$, against any kth attack weapon, and so on. When this circumstance exists, the minimum reduced threat, $E_{Ri}$, of any ith counter-weapon allocation is determined by application of the following expression:

$$E_{Ri} = \sum_{k=1}^{K} P^k \prod_{l=1}^{L} (Q_k)^{x_{1ki}}, \quad \text{(Eqn. 9)}$$

wherein $x_{1ki}$ is the integer number of the 1th type of counter-weapons 116 assigned, for the ith counter-weapon allocation, to the kth attack weapon 112. In the case of two types of counter-weapons 116, L is equal to two. As above-described with regard to Equation 5, the $x_{1ki}$'s which cause the corresponding $E_{Ri}$ to be a minimum for the number, $N_i$ of counter-weapons 116 allocated in the ith allocation comprise the optimum counter-weapon assignment for that particular ith counter-weapon allocation.

Ordinarily the selection by the FWC of one of the prospective counter-weapon allocations for any particular "shoot-look" cycle depends upon the circumstances surrounding the battlefield scenario involved, and depends upon the FWC's analysis of the situation. Benefits, in terms of reducing the reduced threat value, $E_{Ri}$, with increased numbers of counter-weapon allocations, $N_i$, are shown, for example, in Tables 2 and 3, and may assist the FWC in making his counter-weapon allocation decisions.

There can, however, advantageously be established a "default" counter-weapons allocation which may be used, for example, when insufficient time is available to investigate and consider the merits of various different prospective allocations or in the event an inexperienced officer must assume FWC responsibilities. As particularly seen from Table 2, the amount of reduction of $E_{Ri}$ (that is, $\Delta E_{Ri}$) abruptly decreases after the prospective allocation in which $N_i$ is equal to the number, K, or attack weapons 112. A "default" counter-weapon allocation may, therefore, be established as that ith prospective allocation for which $N_i$ is equal to K. The associated assignment of counter-weapons 116, which may ordinarily be the assignment of each one of the counter-weapons in the allocation to a different one of the attack weapons 112, is then used. Other criteria may, however, be applied for establishing a "default" allocation and the present invention is not limited to the "default" allocation being that particular ith allocation in which $N_i$ (or $N_j$) is equal to K.

It is to be appreciated that the foregoing procedure may be used a any time to re-evaluate the tactical situation, whether or not the kill assessment (132) has been completed. In such cases, an expected reduced value, $p^k$, of the threat may be used instead of the unopposed threat value $p^k$. The expected reduced threat value $p^k$ is obtained by the expression:

$$p^k = p^k \prod_{l=1}^{l} Q_{1k} X^{1k}. \quad \text{(Eqn 10)}$$

wherein L is the number of launchers firing against the kth threat and $X_{1k}$ is the number of counter weapons fired from launcher L against the kth attack weapon. This technique is useful for recalculating a situation in which new threats have appeared while counter weapons are still in flight and enables the allocation and assignment of additional weapons to be the battle and/or the redirecting of counter weapons when that is possible.

The foregoing equations may be solved directly by several conventional optimization techniques well-known to those skilled in the art, including exhaustive enumeration, or branch and bound using the gradient projection method expounded by Rosen (Rosen, J.B., "The Gradient Projection Method for Nonlinear Programming, Part I, Linear Constraints, " SIAM J. Applied Mathematics 8, pp. 181-217, 1960.) However, these methods typically require significantly more processing time than a tactician has available. Therefore an alternative method is generally required in practice. A computer program is presented in Appendix A, written in PASCAL which may be employed to provide near optimal solutions to problems of reasonable complexity.

Although there has been described above a particular method, according to the present invention, for allocating and assigning counter-weapons in defense against attack weapons, for the purpose of illustrating the manner in which the invention may be used to advantage, it is to be understood that the invention is not limited thereto. Accordingly, any and all modifications or variations which may occur to those skilled in the art are considered to be within the scope and spirit of the invention as defined by the appended claims.

---

APPENDIX

```
unit WAProcs; {General Procedure Library}
interface
   uses
      WAGlobals, WALib, WAIO, TEval, WALib1;
procedure Psort;
procedure Upsort (lm, km:integer);
procedure Oploss (var lmx, kmx:integer);
procedure Ctewa;
implementation
procedure Psort;
   var
      k:integer;
      l:integer;
      kopx:integer;
      pmax:real;
      k1:integer;
      k2,k3:integer;
      Savsrt:arr1;
begin {Psort}
   for l: = to LxN do        {Replace with do while structure}
      begin
         for k: = 1 to LxN do
            begin
               Pr[l][k]: = Pc[l][k] * Vkwa[k];{compute products}
```

-continued
APPENDIX

```
        end;
Kx[1][1]: = 1;
if (KK > 1) then
  begin {if1}
    kopx := 1;
    or k := 1 to KK do
      begin {do 1}
        pmax := Pr[1][kopx];
        for k2 := 1 to KK do
          begin {do 2}
            pmax := Pr[1][k2];
            kopx := k2;
          end;
        end; {do 2}
Kx[1][k]: = kopx
Savsrt[k]: = Pr[1][kopx]; {save selected Pr's}
Pr[1][kopx] := -1.0; {mark selected Pr's}
    end;{do 1}
    for k := 1 to KK do
      begin
        k1 := Kx[1][k];
        Pr[1][k1]: = Savsrt[k];{restore Pr's}
      end;
    end; {if 1}
  end {1 loop do}
end;{Psort}
{
______}
procedure Upsort;
var
    demax:real;
    K:integer;
    k1:integer;
    k2:integer;
    l:integer;
    m1:integer;
    m2:integer;
begin {Upsort}
demax: = Vkwa[km]*Pc[1m][km]; {threat reduction}
E: = E-demax;
Vkwa[km]: = Vkwa[km]-demax; {reduce specific threat}
for l: = 1 to LL do
  begin
    Pr[1][km]: = Vkwa[km]*Pc[1][km]; {reduced products}
    for m1: = 1 to (KK-1) do {single pass bubble sort}
      begin
        k1: = Kx[1][m1];
        k2: = Kx[1][m1 + 1];
        if(Pr[1][k1 < Pr[1][k2]then
          begin
            Kx[1][m1]: = k2;
            Kx[1][m1 + 1]: = k1;
          end
      end;
  end;
MM[1m]: = MM[1m] - 1; {decrement inventory}
end {Upsort}
{
______}
procedure Oploss;
var
    demax:real;
    l:integer;
    k1:integer;
    k2:integer;
    detst:real;
begin
    lmx: = 1;
    demax: = -1.0;
    for l: = 1 to LL do
      begin {do}
        if(MM[1] > 0)then
          begin {1}
            k1: = Kx[1][1];
            detst: = Pr[1][k1];
            if (MM[1] < KK) then
              begin {2}
                k2: = kx[1][MM[1]+ 1];
                detst: = detst - Pr[1][k2];
              end; {2}
```

-continued
APPENDIX

```
              if ((detst > demax) or ((detst = demax) and (MM[1] >
                MM[1mx]))) then
                begin {3}
                  demax: = detst;
                  kmx: = detst;
                  lmx: = 1;
                end; {3}
            end; {1}
      end; {do}
Upsort(lmx,kmx);{update access matrix}
end; {oploss}
{______ CTEWA ______}
procedure Ctewa; {compute TEWA table and display}
var
    k:integer; {attacker index}
    l:integer; {launcher index}
    m:integer; {number of missile launched}
    Mtot:integer; {total initial weapon inventory}
    secs1:longint; {local real time origin}
    secs2:longint; {local real time}
    temp:real;
    TactRect:rect;
begin {ctewa}
Xtime(0, secs1);                     {WALib] set time origin}
SetRect(TactRect,0,140,115,330);     {[QuickDraw]}
SetTextRect(TactRect);               {[LightSpeed]}
Showtext;                            {[LightSpeed]}
m: = 0;
Mtot: = 0;                           {sum up total inventory}
SortLive;    {[WALib1] Sort out Live combatant indices}
[LoadPc;     [WADBase] Load WA with Pc matrix}
    for l :-1 to LL do
      begin
        MM[l]: = MMi[l];
        Mtot: = Mtot + MM[l];
      end;
E: = 0.0; {sum unopposed threat value}
for k: = 1 to KK do
  begin {1}
    if (BA[k].BLive) then
      begin
        Vkwa[k]: = UpdateTE(k);      {[TEval] update Threat
                                       Evaluation}
        E: = E + Vkwa[k];
      end;
    for l: = 1 to LL do
      begin
        WA[l][k]: = 0; {zero WA matrix}
      end;
  end;{1}
Imax: = 0;
kmax: = 0;
TabPrnt(m,Imax,kmax); {[WAIO] print starting line}
Psort; {presort products}
for m: = 1 to Mtot do
  begin {1}
    Oploss(lmax,kmax); {[WAProcs]}
    WA[lmax][kmax]: = WA[lmax][kmax]+ 1; {update WA matrix}
    TabPrnt(m,Imax,kmax); {[WAIO] print current line}
  end;{1}
Xtime(secs1, secs2);{[WALib]} time elapsed from secs 1
to secs2}
writeln(g); {[MacLib]}
writeln(g, Ctewa elapsed time = ',secs2,'seconds.');
{[MacLib]}
end; {ctewa}
end. {WAProcs}
{______ Weapon Allocation variables ______}
masgn:integer; (number of weapons to be assigned <= Mtot}
asgn1:boolean; {if true, assign one more weapon}
ks1:integer;
Vk:arr1; {Attacker's damage potential, course dependent}
Vkwa:arr1; {Attacker's damage potential, course and time
dependent}
Vki:arr1; {Initial values of Vk, start of engagement}
KK:integer; {Number of attackers}
LL:integer; {Number of Launchers}
ll:integer; {Number of Platforms}
f,g:text; {in and out files}
Pdb:arr12; {Counterthreat data base}
```

-continued

APPENDIX

Pc:arr12; {Counterthreat matrix}
MMi:arint1; {Available weapon Inventory list}
MM:arint1; {Computational weapon Inventory list}
RL:arrr1; {Range of launched weapon}
VIL:arrr1; {Speed of launched weapon}
Pr:arr12; {matrix of threat reduction products}
Kx:arint2; {sort access matrix}
EC:integer; {Number of engagement cycles}
E:real; {Probable reduced threat value}
WA:arint2; {Weapon Assignment Matrix}
Imax:integer; {launcher shoots next}
kmax:integer; {next target}
WARect:rect; {Click Box for initiating WA}

What is claimed is:

1. A method for allocating and assigning, in response to an enemy attack on a target by a plurality, K, of attack weapons, counter-weapons from a plurality, M, of available counter-weapons for defense of said target, the method comprising the steps of:

a) estimating for each kth one of the K attack weapons a target threat value, $P^k$, relative to the target, wherein k=1, 2, ... ,K;

b) estimating for each one of the M counter-weapons a counter-threat value relative to each kth one of the K attack weapons;

c) determining, based upon combining the estimated counter-threat values with the estimated target threat values according to a pre-established relationship, for each ith one of a series of prospective allocations of different numbers, $N_i$, of counter-weapons, an associated optimum assignment of the $N_i$ counter-weapons against the K attack weapons that is selected to cause an associated composite reduced target threat value, $E_{Ri}$, of the attack weapons against the target to have a minimum value;

d) selecting from the series of prospective counter-weapon allocations a particular ith one of the counter-weapons allocations to be used against the K attack weapons; and e) assigning the $N_i$ counter-weapons of the particular selected allocation against the K attack weapons in accordance with the optimum weapons assignment associated with the selected allocation.

2. The weapons allocation and assignment method as claimed in claim 1, wherein the number, M, of available counter-weapons is greater than the number, K, of attack weapons and including the step of defining an ith prospective allocation of counter-weapons for which the number, $N_i$, of counter-weapons allocated is equal to the number, K, of attack weapons as a default allocation and including the step of selecting the default allocation and using the optimum weapons assignment associated therewith.

3. The weapons allocation and assignment method as claimed in claim 1 wherein the number of counter-weapons, $N_i$, in the particular selected counter-weapon allocation is less than the number M of available counter-weapons, and including the further steps of:

a) determining, after firing of the counter-weapons assigned in accordance with the selected allocation, which ones of the K attack weapons have survived the $N_i$ allocated counter-weapons;

b) determining, based upon combining the estimated counter-threat values of the remaining available counter-weapons with the estimated target threat values of the surviving attack weapons in said predetermined manner, for each jth one of a new series of prospective allocations of different numbers, $N_j$, of the remaining counter-weapons, an associated optimum assignment of the $N_j$ counter-weapons against the surviving attack weapons that is selected to cause an associated, composite reduced target threat value, $E_{Rj}$, of the surviving attack weapons against the target to have a minimum value;

c) selecting from the new series of prospective counter-weapon allocations, a particular jth one of the counter-weapons allocations for use against the remaining attack weapons; and d) assigning the $N_j$ counter-weapons of the particular selected allocation against the surviving attack weapons in accordance with the optimum weapons assignment associated with the selected allocation.

4. The weapons allocation and assignment method as claimed in claim 3 including the steps of:

a) estimating for at least some of the surviving attack weapons updated target threat values relative to the target;

b) estimating for at least some of the remaining counter-weapons updated counter-threat values relative to each one of the surviving attack weapons; and c) using the updated target threat values and the updated counter-threat values for determining the new optimum counter-weapon assignments associated with the new series of prospective counter-weapon allocations.

5. The weapons allocation and assignment method as claimed in claim 1 wherein the step of determining the optimum weapons assignments for the series of prospective counter-weapons allocations includes computing the corresponding minimum composite reduced threat values, $E_{Ri}$, according to the equation:

$$E_{Ri} = \sum_{k=1}^{K} P^k(1 - P_k)^{x_{ki}},$$

wherein $E_{Ri}$ is the composite reduced threat value associated with the ith one of the prospective $N_i$ counter-weapons allocations and wherein $x_{ki}$ is equal to the integer number of counter-weapons in the ith allocation assigned to the kth one of the K attack weapons.

6. The weapons allocation and assignment method as claimed in claim 5, including the step of selecting the $x_k$'s for each ith one of the prospective counter-weapons allocations that causes the associated composite reduced target threat value, $E_i$, to be a minimum for the number, $N_i$, of counter-weapons allocated in the ith prospective allocation.

7. A method for allocating and assigning, in response to an enemy attack on a target by a plurality, K, of attack weapons, counter-weapons from a plurality, M, of counter weapons for defense of said target, the method comprising the steps of:

a) estimating for each kth one of the K attack weapons a target threat value, $P^k$, relative to the target, wherein k=1, 2, ... ,K;

b) estimating for each one of the M counter-weapons a counter-threat value, $P_k$, relative to each kth one of the K attack weapons, wherein k=1,2, ... ,K;

c) determining, based upon combining the estimated counter-threat values, $P_k$, with the estimated target threat values, $P^k$, according to a preestablished $P^k$, $P_k$ relationship, for each ith one of a series of prospective allocations of different numbers, $N_i$, of counter-weapons, a corresponding optimum assignment of the $N_i$ counter-weapons against the K attack weapons that causes an associated composite reduced target threat value, $E_{Ri}$, of the attack weapons against the target to have a minimum value, the composite reduced target threat value being determined according to the expression:

$$E_{Ri} = \sum_{k=1}^{K} P^k (1 - P_k)^{x_{ki}}.$$

wherein $x_{ki}$ is equal to the integer number of the $N_i$ counter-weapons in the ith counter-weapons allocation that is assigned to the kth one of the K attack weapons, the $x_{ki}$'s being selected so as to cause the corresponding $E_{Ri}$ to have a minimum value for the number, $N_i$, of counter-weapons allocated in the ith prospective allocation;

d) selecting from the series of prospective allocations of counter-weapons an ith one of the allocations for use against the K attack weapons; and e) assigning the $N_i$ counter-weapons of the selected ith allocation against the K attack weapons in accordance with the optimum weapon assignment associated with the selected counter-weapons allocation.

8. The weapons allocation and assignment method as claimed in claim 7 wherein the number of counter-weapons, $N_i$, in the particular selected counter-weapon allocation is less than the number M of available counter-weapons, and including the further steps of:

a) determining, after firing, the kill effectiveness of the $N_i$ allocated counter-weapons against the K attack weapons so as to thereby establish the surviving attack weapons;

b) estimating for at least some of the surviving attack weapons updated target threat values relative to the target;

c) estimating for at least some of the remaining available counter-weapons updated counter-threat values relative to each one of the surviving attack weapons;

d) determining, based upon combining the estimated counter-threat values of the remaining counter-weapons with the estimated target threat values of the surviving attack weapons in said predetermined manner and using the updated target threat values and the updated counter-threat values, for each jth one of a new series of prospective allocations of different numbers, $N_j$, of the remaining counter-weapons, an associated optimum assignment of the $N_j$ counter-weapons against the surviving attack weapons that causes an associated composite reduced target threat value, $E_{Rj}$, of the surviving attack weapons against the target to have a minimum value;

e) selecting from the new series of prospective counter-weapon allocations, a particular jth one of the counter-weapons allocations for use against the surviving attack weapons; and f) assigning the $N_j$ counter-weapons of the particular selected allocation against the surviving attack weapons in accordance with the optimum weapons assignment associated with the selected allocation.

9. A method for allocating and assigning, in response to an enemy attack on a target by a plurality, K, of attack weapons, counter-weapons from a plurality, M, of counter weapons, including first and second types of counter-weapons, for defense of said target, the method comprising the steps of:

a) estimating for each kth one of the K attack weapons a target threat value, $P^k$, relative to the target, wherein $k = 1, 2, \ldots, K$;

b) estimating for each one of the first type of counter-weapons a counter-threat value, $P_{1k}$, relative to each kth one of the K attack weapons, wherein $k = 1, 2, \ldots, K$;

c) estimating for each one of the second type of counter-weapons a counter-threat value, $P_{2k}$, relative to each kth one of the K attack weapons, wherein $k = 1, 2, \ldots, K$;

d) determining, based upon combining the estimated counter-threat values, $P_{1k}$ and $P_{2k}$, with the estimated target threat values, $P^k$, according to a pre-established relationship, for each ith one of a series of prospective allocations of different numbers, $N_i$, of counter-weapons, an associated optimum assignment of the $N_i$ counter-weapons against the K attack weapons that causes an associated composite reduced target threat value, $E_{Ri}$, of the attack weapons against the target to have a minimum value, the composite reduced target threat value being determined according to the expression:

$$E_{Ri} = \sum_{k=1}^{K} P^k \prod_{l=1}^{L} (1 - P_k)^{x_{lki}}.$$

wherein L is equal to 2 for two types of counter-weapons and wherein $x_{1ki}$ is equal to the integer number of counter-weapons of the lth type that is assigned to the kth one of the K attack weapons for the ith prospective counter-weapon allocation, the $x_{1ki}$'s being selected so as to cause the corresponding $E_{Ri}$ to have a minimum value for the number, $N_i$, of counter-weapons allocated in the ith prospective allocation;

e) selecting from the series of prospective allocations of counter-weapons an ith one of the allocations for use against the K attack weapons; and f) assigning the $N_i$ counter-weapons of the selected allocation against the K attack weapons in accordance with the optimum weapon assignment associated with the selected counter-weapons allocation.

10. The weapons allocation and assignment method as claimed in claim 9 wherein the number of counter-weapons, $N_i$, in the particular selected counter-weapon allocation is less than the number M of available counter-weapons, and including the further steps of:

a) determining, after firing, the kill effectiveness of the $N_i$ allocated counter-weapons against the K attack weapons so as to thereby establish the surviving attack weapons;

b) estimating for at least some of the surviving attack weapons updated target threat values relative to the target;

c) estimating for at least some of the remaining available counter-weapons updated counter-threat values relative to each one of the surviving attack weapons;

d) determining, based upon combining the estimated counter-threat values of the remaining counter-weapons with the estimated target threat values of the surviving attack weapons in said predetermined manner and using the updated target threat values and the updated counter-threat values, for each jth one of a new series of prospective allocations of different numbers, $N_j$, of the remaining counter-weapons, an associated optimum assignment of the $N_j$ counter-weapons against the surviving attack weapons that causes an associated composite reduced target threat value, $E_{Rj}$, of the surviving attack weapons against the target to have a minimum value;

e) selecting from the new series of prospective counter-weapon allocations, a particular jth one of the counter-weapons allocations for use against the surviving attack weapons; and f) assigning the $N_j$ counter-weapons of the particular selected allocation against the surviving attack weapons in accordance with the optimum weapons assignment associated with the selected allocation.

* * * * *